(No Model.)

F. RERRICH.
FILTER CAN.

No. 478,365. Patented July 5, 1892.

Witnesses:
E. B. Bolton
H. Palmer

Inventor:
Franz Rerrich
By Richards
his Attorneys.

United States Patent Office.

FRANZ RERRICH, OF BUDA-PESTH, AUSTRIA-HUNGARY.

FILTER-CAN.

SPECIFICATION forming part of Letters Patent No. 478,365, dated July 5, 1892.

Application filed January 9, 1892. Serial No. 417,499. (No model.)

*To all whom it may concern:*

Be it known that I, FRANZ RERRICH, a subject of the King of Hungary, Emperor of Austria, residing at Buda-Pesth, Austria-Hungary, have invented certain new and useful Improvements in Filter-Cans, of which the following is a specification.

The subject of the present invention is a filtering-pot, in which the cover is so connected with a sieve that when the cover is inserted into the pot the liquid contained therein will be filtered as it is poured therefrom.

In the accompanying drawings such a filtering-pot is shown.

Figure 1:
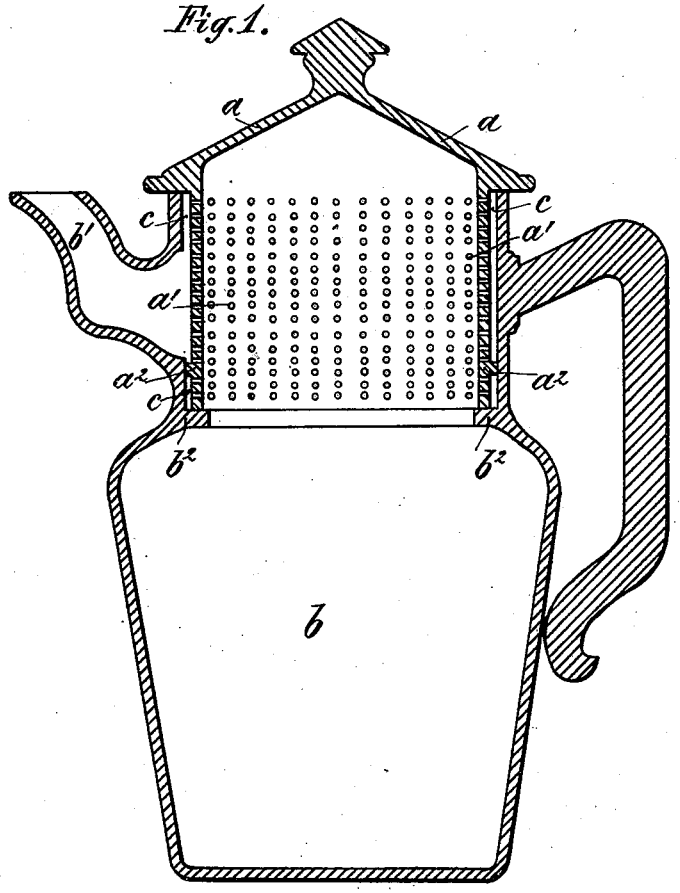
Figure 2:
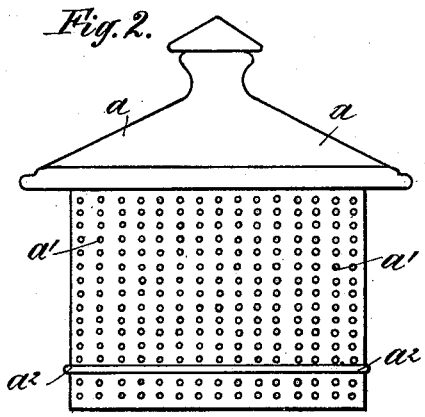
Figure 3:
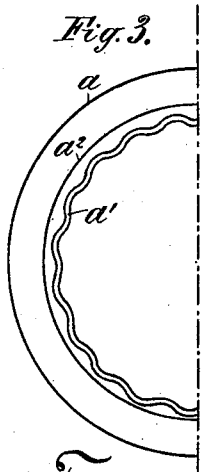

Figure 1 is a perpendicular section of said pot. Fig. 2 shows the cover provided with a sieve in face view. Fig. 3 shows a modification of the sieve.

The cover $a$ has on its lower side a cylindrical sieve $a'$, provided near its lower end with an external annular flange $a^2$. This flange guides the sieve to its proper position in the pot $b$. The latter is provided in its interior below the spout $b'$ with an annular shoulder $b^2$, on which the lower edge of the sieve $a'$ rests when put into the pot $b$ and when the cover closes the top of the pot. This shoulder $b^2$ may be so formed that it centers the sieve when inserted. In such construction the flange $a^2$ of the sieve would be superfluous.

As seen in Fig. 1, the sieve $a'$ has a much smaller diameter than the upper part of the pot, so that an annular intermediate space $c$ is formed. The liquid when being poured out can only penetrate into this space after having passed through the sieve $a'$, so that only filtered liquid can reach the spout $b'$ of the pot. The sieve $a'$ can have round or oblong holes, and can be cylindrical, rectangular, or corrugated, as in Fig. 3, which shows a half-sieve and cover in bottom view.

I claim—

The herein-described filtering-pot, consisting of the combination, with the lower body portion provided with an interiorly-projecting rib in its upper part, of a filtering-sieve above said lower body portion adapted to rest on said projecting rib, said filtering-sieve being provided with projections whereby an annular space is provided between the outer side of the sieve and the inner side of the pot, substantially as set forth.

In testimony whereof I have signed my name to this specification in the presence of two subscribing witnesses.

FRANZ RERRICH.

Witnesses:
   MACHILET,
   VARGHA ZUGMONT.